United States Patent
Suzuki

(10) Patent No.: US 10,322,494 B2
(45) Date of Patent: Jun. 18, 2019

(54) NOZZLE ASSEMBLY AND SURFACE TREATMENT METHOD WITH NOZZLE ASSEMBLY

(71) Applicant: SINTOKOGIO, LTD., Nagoya-shi, Aichi (JP)

(72) Inventor: Yukinori Suzuki, Toyokawa (JP)

(73) Assignee: SINTOKOGIO, LTD., Nagoya-shi, Aichi (JP)

( * ) Notice: Subject to any disclaimer, the term of this patent is extended or adjusted under 35 U.S.C. 154(b) by 0 days.

(21) Appl. No.: 15/551,528

(22) PCT Filed: Feb. 8, 2016

(86) PCT No.: PCT/JP2016/053644
§ 371 (c)(1),
(2) Date: Aug. 16, 2017

(87) PCT Pub. No.: WO2016/136443
PCT Pub. Date: Sep. 1, 2016

(65) Prior Publication Data
US 2018/0056484 A1 Mar. 1, 2018

(30) Foreign Application Priority Data
Feb. 25, 2015 (JP) .................................. 2015-035037

(51) Int. Cl.
*B24C 5/04* (2006.01)
*B05B 7/06* (2006.01)
(Continued)

(52) U.S. Cl.
CPC .................. *B24C 5/04* (2013.01); *B05B 7/06* (2013.01); *B05B 7/14* (2013.01); *B05B 7/1404* (2013.01);
(Continued)

(58) Field of Classification Search
CPC ............. B24C 1/086; B24C 5/02; B24C 5/04; B24C 7/0038; B24C 7/0046; B24C 7/0076;
(Continued)

(56) References Cited

U.S. PATENT DOCUMENTS 4,555,872 A * 12/1985 Yie ....................... B05B 7/1431
451/102
4,955,164 A * 9/1990 Hashish .................. B24C 1/045
451/40
(Continued)

FOREIGN PATENT DOCUMENTS

JP    S59-045300       3/1984
JP    H02-160514 A     6/1990
(Continued)

OTHER PUBLICATIONS

Office Action in Japan Application No. 2017-502038, dated Feb. 25, 2019, 4 pages.

*Primary Examiner* — Eileen P Morgan
(74) *Attorney, Agent, or Firm* — Brinks Gilson & Lione

(57) ABSTRACT

The present invention is a nozzle assembly having a nozzle main body including an ejection material suction port and an ejection port which ejects the ejection material with the compressed air, and an air nozzle which jets the compressed air into the nozzle main body. The nozzle main body includes a mixing chamber which mixes the ejection material with the compressed air, a first pathway directed from the ejection material suction port toward the mixing chamber, and a second pathway directed from the mixing chamber toward the ejection port. The air nozzle includes a compressed air jet portion and a third pathway directed to the compressed air jet portion, and the third pathway is inserted into the nozzle main body. The compressed air jet portion of the air nozzle is provided with a flow contracting portion having an opening.

5 Claims, 8 Drawing Sheets

(51) Int. Cl.
*B05B 7/14* (2006.01)
*B24C 7/00* (2006.01)
*B24C 1/08* (2006.01)
*B24C 5/02* (2006.01)
*B24C 9/00* (2006.01)
*B05B 14/48* (2018.01)
*B05B 14/45* (2018.01)

(52) U.S. Cl.
CPC ............ *B05B 7/1486* (2013.01); *B05B 14/45* (2018.02); *B05B 14/48* (2018.02); *B24C 1/086* (2013.01); *B24C 5/02* (2013.01); *B24C 7/0046* (2013.01); *B24C 9/006* (2013.01); *Y02P 70/179* (2015.11)

(58) Field of Classification Search
CPC ........... B24C 7/0084; B05B 7/06; B05B 7/14; B05B 7/1486
USPC ...................................... 451/38, 39, 40, 102
See application file for complete search history.

(56) References Cited

U.S. PATENT DOCUMENTS

| | | | | |
|---|---|---|---|---|
| 5,334,561 | A * | 8/1994 | Matsui | B05B 1/00 239/DIG. 19 |
| 5,857,900 | A * | 1/1999 | Shank, Jr. | B24C 5/04 451/102 |
| 5,876,267 | A * | 3/1999 | Kanda | B24C 5/04 451/102 |
| 6,283,833 | B1 * | 9/2001 | Pao | B24C 5/04 451/102 |
| 9,884,406 | B2 * | 2/2018 | Hashish | B24C 7/0046 |
| 10,076,821 | B2 * | 9/2018 | Miller | B24C 7/0053 |
| 2005/0048873 | A1 * | 3/2005 | Alberts | B24C 1/04 451/5 |
| 2006/0223423 | A1 * | 10/2006 | Dorfman | B24C 1/045 451/38 |
| 2007/0155289 | A1 * | 7/2007 | Miller | B24C 1/045 451/38 |
| 2009/0318064 | A1 * | 12/2009 | Hashish | B24C 1/045 451/36 |
| 2011/0086579 | A1 * | 4/2011 | Gelbart | B24C 1/045 451/40 |
| 2011/0306279 | A1 * | 12/2011 | Hunziker | B24C 7/0023 451/102 |
| 2012/0021676 | A1 * | 1/2012 | Schubert | B24C 1/045 451/38 |
| 2012/0156969 | A1 * | 6/2012 | Liu | B24C 5/02 451/40 |
| 2012/0252325 | A1 * | 10/2012 | Schubert | B24C 1/045 451/60 |
| 2013/0267152 | A1 * | 10/2013 | Tera | B24C 1/045 451/99 |
| 2014/0004776 | A1 * | 1/2014 | Bury | B24C 1/045 451/102 |
| 2014/0094093 | A1 * | 4/2014 | Miller | B24C 7/0023 451/39 |
| 2015/0196989 | A1 * | 7/2015 | Hashish | B24C 7/0046 451/40 |
| 2016/0129551 | A1 * | 5/2016 | Kata | B24C 5/04 451/102 |
| 2016/0236323 | A1 * | 8/2016 | Mase | B24C 5/02 |

FOREIGN PATENT DOCUMENTS

| | | |
|---|---|---|
| JP | H03-49899 A | 3/1991 |
| JP | H06-315863 A | 11/1994 |
| JP | H08-267360 A | 10/1996 |

* cited by examiner

NOZZLE ASSEMBLY AND SURFACE TREATMENT METHOD WITH NOZZLE ASSEMBLY

This application is a 371 application of PCT/JP2016/053644 having an international filing date of Feb. 8, 2016, which claims priority to JP2015-035037 filed Feb. 25, 2015, the entire contents of which are incorporated herein by reference.

TECHNICAL FIELD

The present invention relates to a nozzle assembly and a surface processing method with the nozzle assembly, and more particularly to a nozzle assembly for processing a surface of a workpiece by ejecting a solid-gas two phase flow, and a surface processing method by using the nozzle assembly.

BACKGROUND ART

It is conventionally known a surface processing (blasting, shot peening, coating, etc.) of a workpiece by ejecting "abrasive grain," "shot," "granular material such as coating material" or the like as ejection material together with compressed air directed onto the workpiece. Known nozzle assemblies for such surface processing of workpieces include a pressure-type nozzle assembly (Patent Literature 1) in which a pressure vessel filled with ejection material is pressurized by compressed air or the like and ejection material is fed to a pressurized air flow and ejected as a solid-gas two phase flow together with the pressurized air; and a suction-type nozzle assembly (Patent Literature 2) in which ejection material is suctioned in by a suction force from a compressed air flow introduced into an air nozzle and ejected as a solid-gas two phase flow together with the compressed air.

Compared to a suction-type nozzle assembly, a pressure-type nozzle assembly is able to eject ejection material at a high velocity, so it has a high processing capacity; it is able to impart compressive residual stress down to a lower depth position in a processing of shot peening, and is able to form a high adhesion strength coating during the coating process. However, the pressure-type nozzle assembly has the problem that ejection material volume and ejection time is limited by the capacity of the pressurizing tank, so that long duration continuous ejection is not possible.

In contrast, a suction-type nozzle assembly has an advantage that the container for holding ejection material does not need to be xsealed, therefore the ejection material can be continuously ejected. However a suction-type nozzle assembly suctions ejection material exposed to the atmosphere together with air, leading to the problem of pressure loss, which slows the ejecting velocity compared to a pressure-type nozzle. A conceivable way to increase an ejecting velocity is to compensate for the compressed air pressure loss portion by raising the pressure of the compressed air. However this requires a stronger compressed air source, which leads to increased equipment costs and operating energy for the compressed air source, etc.

CITATION LIST

Patent Literature 1: Japanese Patent Unexamined Publication No. H02-160514A

Patent Literature 2: Japanese Patent Unexamined Publication No. H08-267360A

SUMMARY OF INVENTION

Technical Problems

The present invention was made to resolve the above-described problems with the conventional art, and it is an object of the present invention is to provide a nozzle assembly capable of ejecting ejection material toward a workpiece at a high velocity to process the surface of the workpiece, and to provide a surface processing method with the nozzle assembly.

Solution to Problems

The above object is achieved according to the present invention by providing a nozzle assembly for processing the surface of a workpiece by ejecting solid-gas two phase flow in which ejection material is mixed with compressed air, the nozzle assembly comprising: a nozzle main body including an ejection material suction port configured to suction the ejection material and an ejection port configured to eject the suctioned ejection material with the compressed air; and an air nozzle configured to jet the compressed air into the nozzle main body; wherein the nozzle main body includes a mixing chamber forming a space for mixing the ejection material suctioned into the nozzle main body from the ejection material suction port with the compressed air jetted from the air nozzle, a first pathway directed from the ejection material suction port toward the mixing chamber, and a second pathway directed from the mixing chamber toward the ejection port; wherein the air nozzle includes a compressed air jet portion formed at a tip thereof and a third pathway directed to the compressed air jet portion, and the air nozzle is inserted into the nozzle main body so that the third pathway is positioned on the same axial center as the second pathway of the nozzle main body, and so that the compressed air jet portion is positioned in the mixing chamber of the nozzle main body; and wherein the compressed air jet portion of the air nozzle is provided with a flow contracting portion having an opening whose cross section is smaller than a cross section of the third pathway.

In the nozzle assembly according to the present invention thus constituted, the compressed air jet portion of the air nozzle is provided with the flow contracting portion, thereby speeding the flow velocity of the jet flow of compressed air jetted from the compressed air jet portion. Also, deceleration caused by impact with walls of the mixing chamber is suppressed, since an expansion in a width-direction of the jet flow of the compressed air is suppressed by the flow contracting portion. As a result by using the nozzle assembly of the present invention, the flow velocity of the solid-gas two phase flow speeds up even at a compressed air flow volume equal to that of a conventional nozzle assembly, so surface processing efficiency improves.

In the present invention, preferably, the third pathway of the air nozzle includes a flow straightening portion having a continuous unchanging cross sectional area, and wherein the flow contracting portion is connected through the flow straightening portion, and a cross sectional area ratio (S2/S1), being a ratio of a cross sectional area (S2) of the flow contracting portion to a cross sectional area (S1) of the flow straightening portion, is set at 0.3 to 0.8.

In the present invention thus constituted, when compressed air is jet from the flow contracting portion of the compressed air jet portion, the velocity of the jet flow can be increased without disturbing the jet flow. As a result, in the present invention, the velocity of solid-gas two phase flow increases, and the surface processing efficiency is improved.

In the present invention, preferably, a flow contracting portion ratio (L2/D2), being a ratio of a length (L2) of the opening to a diameter (D2) of the opening in the flow contracting portion of the air nozzle, is set at 0.1 to 0.5.

In the present invention thus constituted, the straightness of advance of the jet flow of the compressed air jetted from the compressed air jet portion can be improved, the velocity of the solid-gas two phase flow increases, and the surface processing efficiency improves.

In the present invention, preferably, a flow straightening portion ratio (L1/D1), being a ratio of a length (L1) of the flow straightening portion to a diameter (D1) of the flow straightening portion, is set at 2 to 50.

In the present invention thus constituted, the compressed air flow is straightened before it passes through the flow contracting portion, therefore the straightness of advance of the compressed air jet flow can be further improved so that the velocity of the solid-gas two phase flow increases, and the surface treatment efficiency improves.

In the present invention, preferably, the nozzle assembly ejects abrasive grains which are used as the ejection material in a blast processing apparatus.

In the present invention thus constituted, the ejection material can be ejected without pulsations by the nozzle assembly. Also, because the velocity of the ejection material is fast, a blasting processing capacity is increased. I.e., the installation of the nozzle assembly of the present invention on a blasting apparatus enables efficient and stable blast processing to be performed.

The present invention also provide a surface processing method for processing the surface of a workpiece by using the above described nozzle assembly, comprising the steps of: jetting compressed air into the mixing chamber in the nozzle main body from the air nozzle, and placing the mixing chamber at a negative pressure; suctioning the ejection material into the mixing chamber from the ejection material suction port of the nozzle main body by using the negative pressure in the mixing chamber of the nozzle main body, and mixing the ejection material with the compressed air jetted from the air nozzle in the mixing chamber; ejecting solid-gas tow phase flow in which the ejection material is mixed with compressed air from an ejection port of the nozzle main body; and processing the surface of the workpiece by a collision of the ejected ejection material with the surface of the workpiece; wherein in the step of jetting the compressed air from the air nozzle, an expansion of a jet flow of the compressed air is suppressed by the flow contracting portion of the air nozzle.

In the present invention, preferably, the jet flow of the compressed air jetted from the air nozzle has a velocity having a higher speed toward the outer edge thereof.

In the present invention thus constituted, because the velocity of the jet flow increases at the outer edge, straightness of advance increases at the outer edge. Hence expansion caused by the jet flow at the outer edge is suppressed, notwithstanding a tendency to expand at the center portion where velocities are slow, therefore the straightness of advance of the jet flow of the compressed air as a whole is improved.

Advantageous Effects of the Invention

According to the nozzle assembly of the present invention, both high processing capacity, which is the advantage of the pressure-type nozzle assembly, and continuous processing, which is the advantage of the suction-type nozzle assembly, can be satisfied. This enables surface processing such as blasting, shot peening, coating, and the like to be continuously performed in a dry condition.

DESCRIPTION OF THE EMBODIMENTS

Figure 1:
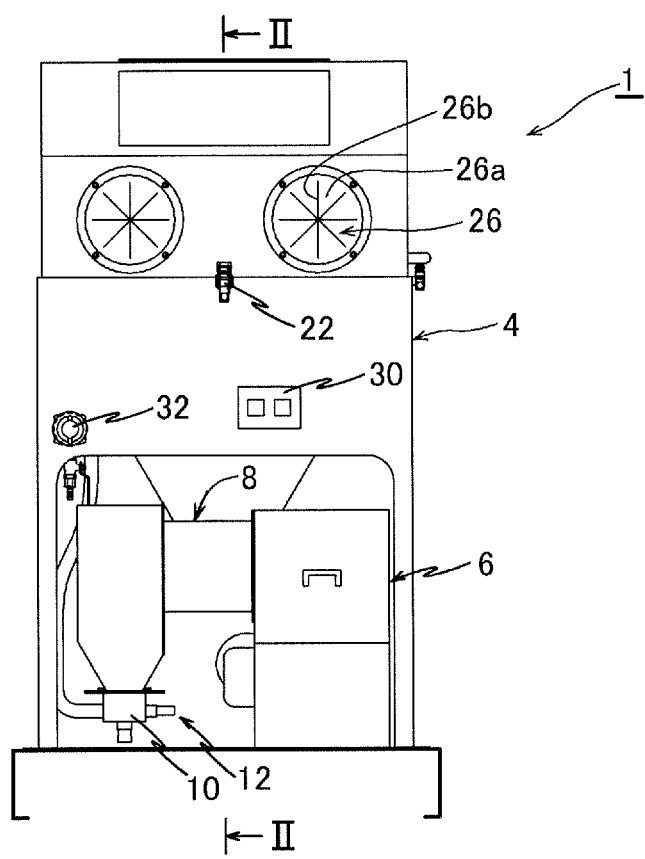
FIG. 1 is a front elevational view showing a blast processing apparatus using a nozzle assembly according to an embodiment of the present invention.

Hereinafter, referring to the attached drawings, it will be explained a nozzle assembly according to an embodiment of the present invention. First, referring to FIGS. 1 and 2, it will be explained an outline of a blasting processing apparatus using a nozzle assembly according to an embodiment of the present invention. FIG. 1 is a front elevational view showing a blast processing apparatus using a nozzle assembly according to an embodiment of the present invention, and FIG. 2 is a cross sectional view seen along line II-II in FIG. 1.

Figure 2:
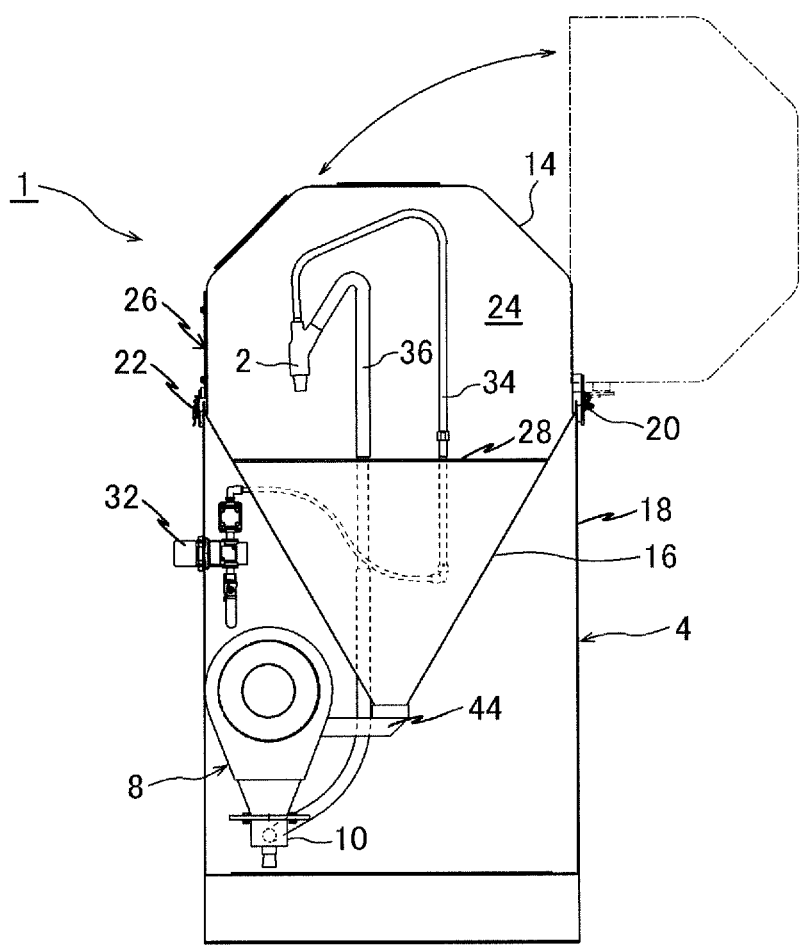
FIG. 2 is a cross sectional view seen along line II-II in FIG. 1.

As shown in FIGS. 1 and 2, the blast processing apparatus 1 comprises: a nozzle assembly 2 according to the present embodiment for blast processing; a housing 4 for housing the nozzle assembly 2; a suction mechanism 6 for suctioning the interior of the housing 4; a classifying mechanism 8 for classifying ejection material, disposed on the bottom portion of the housing 4; a storage hopper 10 for storing classified ejection material; and an ejection material transport mechanism 12 for transporting projection material stored in the storage hopper 10.

The housing 4 comprises: an upper casing 14, a lower casing 16 placed on the bottom of the upper casing 14, and an outer frame 18 affixed on the outside of the lower casing 16. The upper casing 14 and the outer frame 18 are linked by a hinge 20 and a latch lock 22; by releasing the latch lock 22, the upper casing 14 can be opened and closed relative to the lower casing 16.

The internal space in the upper casing 14 and the lower casing 16 forms a blast processing chamber 24. A nozzle assembly 2 is disposed on the blast processing chamber 24.

A working portion 26 is installed on the front of the upper casing 14. The working portion 26 serves both as an intake port for drawing in outside air to the blasting chamber 24, and as an insertion opening for an operator to insert a hand into the blast processing chamber 24 in a blast processing. A rubber sheet 26a is affixed to the working portion 26, and multiple slits 26b extending radially from the center thereof are formed therein.

A work plate 28 on which a workpiece W is placed when a blast processing is performed is affixed to the blast processing chamber 24. Multiple openings are disposed on the work plate 28 so that granular material containing ejection material can pass through.

A control panel 30 and a pressure adjustment valve 32 are attached to the front side of the housing 4. The compressed air supplied from the pressure adjustment valve 32 is supplied to the nozzle assembly 2 by a hose 34. The ejection material in the storage hopper 10 is transported by a hose 36 to the nozzle assembly 2.

Figure 3:
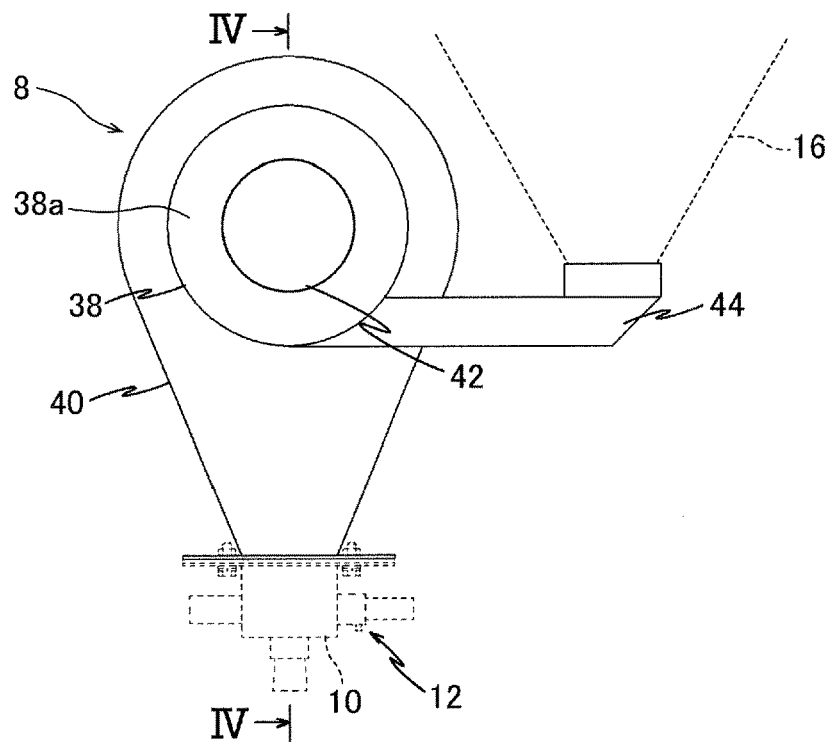
FIG. 3 is a side elevational view showing a classification mechanism on the blast processing apparatus in FIG. 1.
Figure 4:
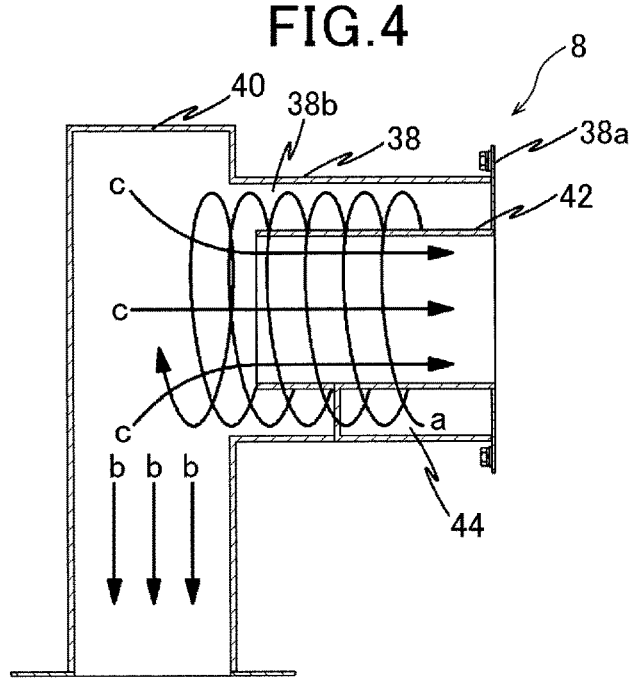
FIG. 4 is a cross sectional view seen along line IV-IV in FIG. 3.

Next, referring to FIGS. 3 and 4, it will be explained the classifying mechanism 8 in detail. FIG. 3 is a side elevational view showing a classification mechanism on the blast processing apparatus in FIG. 1, and FIG. 4 is a cross sectional view seen along line IV-IV in FIG. 3.

The classifying mechanism 8 is a mechanism for separating the granular material in the blasting chamber 24 into reusable ejection material and dust. Dust here refers to cutting chips produced in blast processing or ejection material which has reached a non-reusable size due to impacts, etc. The classifying mechanism 8 is placed midway along the pathway from the blasting chamber 24 toward the suction mechanism 6 for suctioning the blast processing chamber 24, and performs separations using the wind force created by the suction mechanism 6.

In the blast processing apparatus 1, reusable ejection material has heavier particles than the dust, so the reusable ejection material can be separated from dust by classification. Specifically, as shown in FIG. 3, the classifying mechanism 8 comprises: a flow straightening member 38 with a circular vertical cross section and one end surface (the right side in FIG. 4) closed by a closing plate 38a; a classifying member 40 in which the top of the vertical cross section seen from the side direction in FIG. 3 is a circle with a diameter larger than a diameter of the flow straightening member 38, and on which the bottom extends so as to narrow in spacing toward the bottom end (i.e., the horizontal cross sectional area continuously shrinks toward the bottom end), and the vertical cross section thereof seen from the front as shown in FIG. 4 is a vertically long square, the bottom surface of which is open; a suction member 42 disposed concentrically with the flow straightening member 38 on the inside of the flow straightening member 38 and having a cylindrical shape open at both ends; and an insertion member 44 disposed on the side surface of the flow straightening member 38. The above-described suction mechanism 6 is linked to the suction member 42.

In the classifying mechanism 8, the granular material containing ejection material is transported to the classifying mechanism 8 along with air by the operation of the suction mechanism 6 linked to the classification member 40, and flows in a helical shape along the inside wall of the flow straightening member 38 toward the classifying member 40 in the flow straightening portion 38b formed in the inside wall surface of the flow straightening member 38 and the outside wall surface of the suction member 42. The granular material containing ejection material which has passed through the flow straightening portion 38b advances as it circulates further to reach the classifying member 40. It then further advances while decelerating as it continues to circulate ("a" in FIG. 4). When decelerating, the reusable ejection material, being heavy granular material, drops to the bottom portion of the classifying member 40 by gravity, piling up in the storage hopper 10 affixed to the bottom portion of the classifying mechanism 8 ("b" in FIG. 4). On the other hand, non-reusable ejection material of light particle or cutting chips produced by blasting is suctioned in to the suction mechanism 6 by the suction member 42 and trapped on the trapping filter placed inside the suction mechanism 6 ("c" in FIG. 4).

Figure 5:
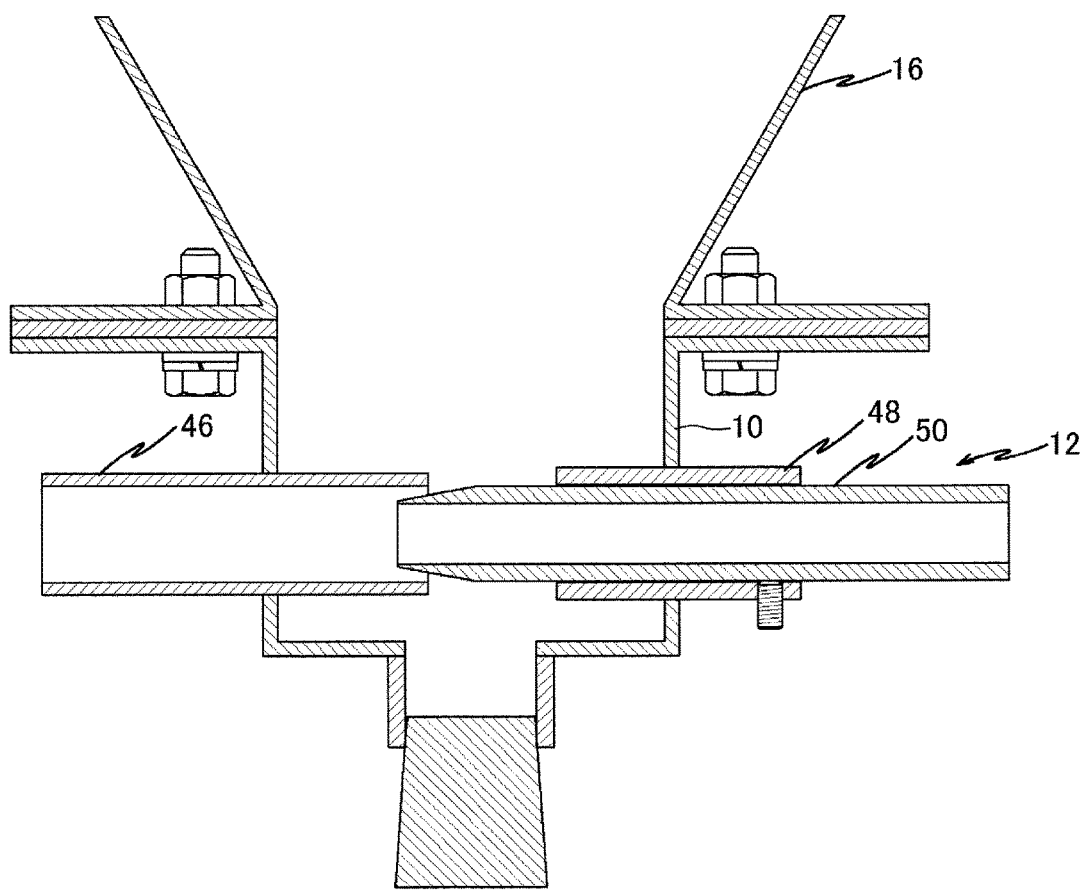
FIG. 5 is a cross sectional view showing a storage hopper and an ejection material transport mechanism in the blast processing apparatus in FIG. 1.

Next, referring to FIG. 5, it will be explained the storage hopper 10 and the ejection material transport mechanism 12 in detail. FIG. 5 is a cross sectional view showing a storage hopper and an ejection material transport mechanism in the blast processing apparatus in FIG. 1.

As shown in FIG. 5, the ejection material transport mechanism 12, being a mechanism for transporting the ejection material stored in the storage hopper 10 to the nozzle assembly 2, is disposed on the storage hopper 10. The ejection material transport mechanism 12 comprises: a circular pipe-shaped ejection material extraction tube 46 affixed so as to penetrate the side wall of the storage hopper 10 (the left wall in FIG. 5); a circular pipe-shaped outside air introducing tube attachment member 48 affixed so as to penetrate the side wall facing the ejection material extraction tube 46 (the right wall in FIG. 5) in the storage hopper 10; and an outside air introducing tube 50, affixed by through-insertion into the outside air introducing tube attachment member 48. The ejection material extraction tube 46 is linked through the above-described hose 36 to an ejection material suction port 70, described below, on the nozzle assembly 2 (see FIG. 6).

The air flow flowing toward the nozzle assembly 2 is generated inside the ejection material extraction tube 46 by the suction force produced inside the nozzle assembly 2. At that time, outside air is drawn in by the outside air introducing tube 50. I.e., an outside air flow is being jetted at the tip of the outside air introducing tube 50. The air flow produces an air flow directed toward the ejection material suction port 70 close to the right end of the ejection material extraction tube 46. The ejection material inside the storage hopper 10, riding the air flow, is drawn into the ejection material extraction tube 46 and transported to the nozzle assembly 2.

Figure 6:
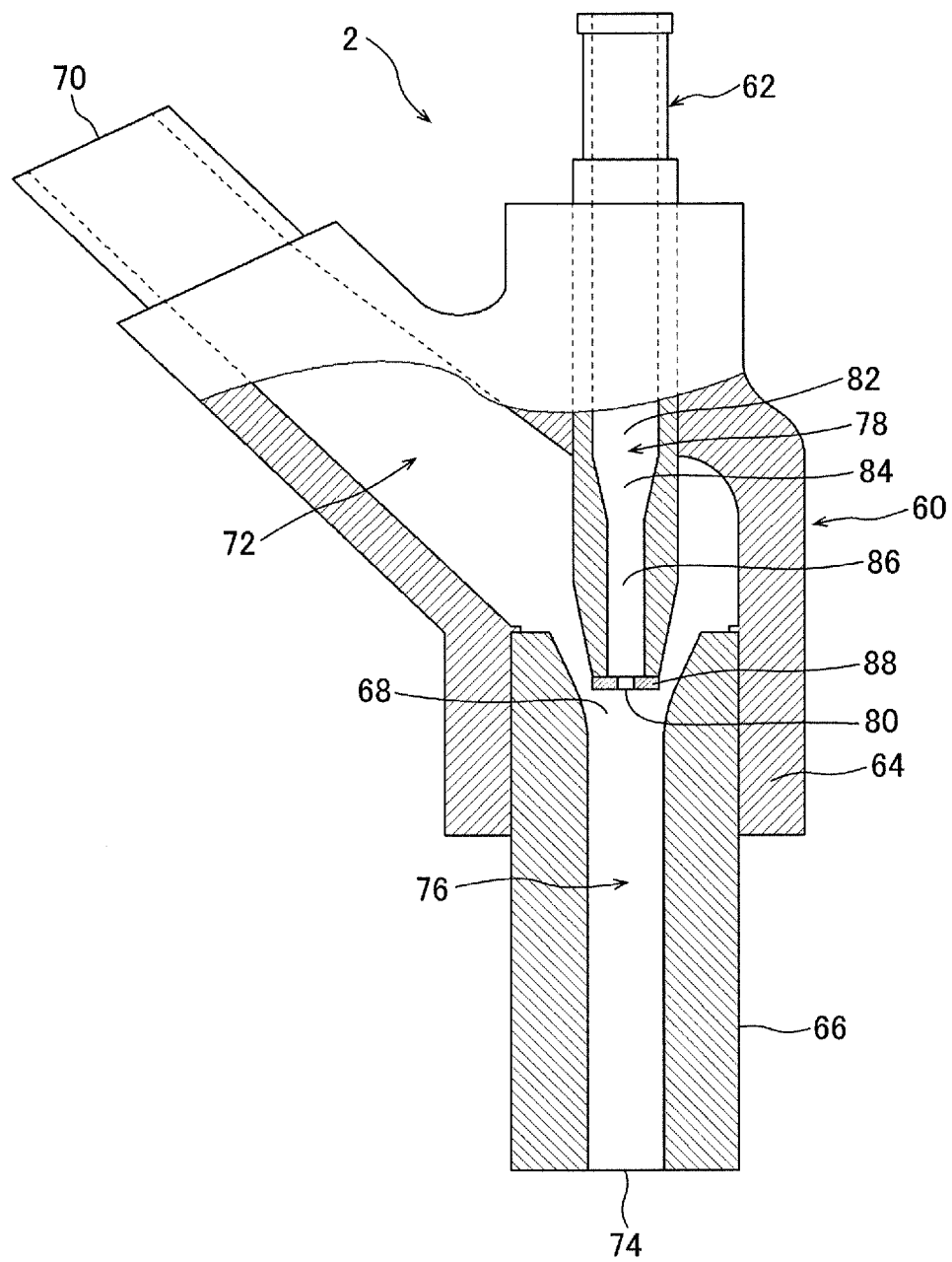
FIG. 6 is a partial cross sectional view showing a nozzle assembly according to an embodiment of the present invention.
Figure 7:
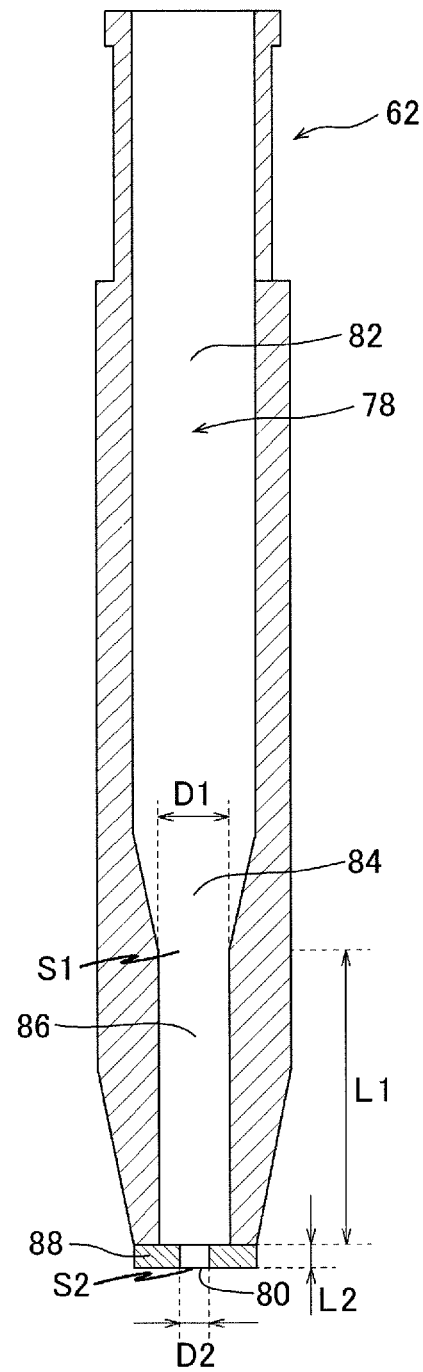
FIG. 7 is a cross sectional view showing an air nozzle in a nozzle assembly according to an embodiment of the present invention.
Figure 8:
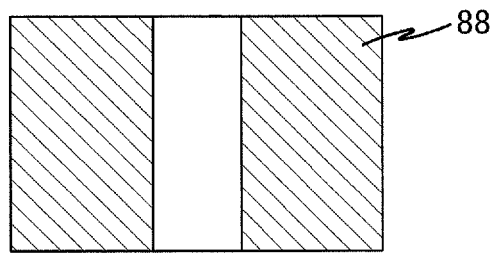
FIG. 8 is a cross sectional view showing a first example of the flow contracting portion of an air nozzle of a nozzle assembly according to an embodiment of the present invention.
Figure 9:
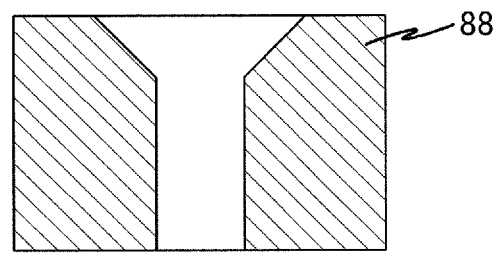
FIG. 9 is a cross sectional view showing a second example of the flow contracting portion of an air nozzle of a nozzle assembly according to an embodiment of the present invention.
Figure 10:
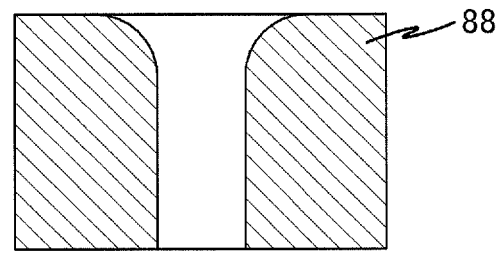
FIG. 10 is a cross sectional view showing a third example of the flow contracting portion of an air nozzle of a nozzle assembly according to an embodiment of the present invention.

Next, referring to FIGS. 6 through 10, it will explained details of a nozzle assembly 2 according to an embodiment of the present invention. FIG. 6 is a partial cross sectional view showing a nozzle assembly according to an embodiment of the present invention, FIG. 7 is a cross sectional view showing an air nozzle in a nozzle assembly according to an embodiment of the present invention, and FIGS. 8 through 10 are respectively cross sectional views showing a first, second, and third example of the flow contracting portion of an air nozzle of a nozzle assembly according to an embodiment of the present invention.

As shown in FIG. 6, the nozzle assembly 2 of the embodiment of the present invention comprises a nozzle main body 60 and an air nozzle 62 for jetting compressed air to the interior of the nozzle main body 60. The nozzle main body 60 comprises a nozzle holder 64 and a cylindrical ejection nozzle 66, inserted from one end (the bottom end surface side in FIG. 3) of the nozzle holder 64 and affixed. The air nozzle 62 is inserted and affixed on the other end (the top end surface side in FIG. 3) of the nozzle holder 64 of the nozzle main body 60. A mixing chamber 68 forming an internal space of the nozzle main body 60 is placed close to the bottom end of the air nozzle 62 inside the nozzle main body 60 and the top end of the ejection nozzle 66.

An ejection material suction port 70 for drawing in the ejection material and a first pathway 72 serving as a pathway from the ejection material suction port 70 toward the mixing chamber 68 are formed on the top portion of the nozzle holder 64.

A circular ejection port 74 for ejecting solid-gas two phase flow is formed at the bottom end of the ejection nozzle 66; a second pathway 76 serving as a pathway from the mixing chamber 68 toward the ejection port 74 is also formed.

The above-described ejection material suction port 70, first pathway 72, mixing chamber 68, second pathway 76, and ejection port 74 are communicated in the nozzle main body 60.

As shown in FIG. 7, the air nozzle 62 is cylindrical; a third pathway 78, being a compressed air pathway, is formed on its interior; in addition, a compressed air jet portion 80 is disposed on the tip where compressed air is jetted (the bottom end in FIG. 7). The third pathway 78 of the air nozzle 62 comprises: a compressed air introducing portion 82 with a continuous diameter, an accelerating portion 84 communicating with the compressed air introducing portion 82 and having a gradually constricting diameter toward the tip, and a flow straightening portion 86 communicating with the accelerating portion 84 and having a fixed diameter. Note that if the difference between the cross sectional area of the compressed air introducing portion 82 and the cross sectional area of the flow straightening portion 86 is at a level not interfering with the flow of compressed air, the accelerating portion 84 may be omitted.

The air nozzle 62 is inserted into the nozzle holder 64 and affixed so that the compressed air jet portion 80 thereof is positioned on the mixing chamber 68 of the nozzle main body 60. The other end of the air nozzle 62 (the top end in FIGS. 6 and 7) is communicated through the hose 34 and pressure adjustment valve 32 to a compressed air supply source (not shown), and compressed air is jetted into the mixing chamber 68 by operating the compressed air supply source. Since the jet flow advances straight ahead while pulling in surrounding air, the mixing chamber 68 is placed at a negative pressure, thereby producing a suction force. The degree of the suction force changes depending on the distance between the compressed air jet portion 80 and an inside wall surface of the ejection nozzle 66, so the air nozzle 62 is adjusted by moving it in the vertical direction to optimize the suction force, and the nozzle holder 64 is affixed using bolts or the like, not shown. Under the suction force, the ejection material is drawn in toward the mixing chamber 68 from the ejection material suction port 70. The ejection material reaching the mixing chamber 68 is mixed with compressed air, and the mixed compressed air and ejection material passes through the second pathway 76 to be ejected as a solid-gas two phase flow from the ejection port 74.

When jetting compressed air from a compressed air jet portion in a conventional apparatus, the jet flow would expand immediately after jetting and impact the walls of the mixing chamber, resulting in jetting energy losses. The jetting energy losses would cause the suction force for suctioning the ejection material and the flow velocity of solid-gas two phase flow to diminish, thereby reducing processing capacity. To reduce the energy loss, a flow contracting portion 88 having a round opening smaller than the cross sectional area of the third pathway 78 close to the flow straightening portion 86 is disposed on the compressed air jet portion 80 in the nozzle assembly 2 of the embodiment of the present invention. Since the opening diameter of the flow contracting portion 88 is small, compressed air passing through the flow straightening portion 86 is accelerated in the flow contracting portion 88. In addition, the flow velocity of jetted compressed air which has passed through the flow contracting portion 88 increases with proximity to the outside edge, and has a high degree of straightness. This is because compressed air which has passed through the third pathway 78 is suddenly compressed in the flow contracting portion 88, and this compression results in relative acceleration on the outside edge of the compressed air flow. Thus even if the center portion of the jet flow jetted from the compressed air jet portion 80 seeks to expand in the width direction, the jet flow at the outer edge reduces this so that the straightness of the compressed air as a whole improves, and energy losses caused by impacts with the wall surface of the mixing chamber 68 can be reduced.

In the air nozzle 62, if the cross sectional area ratio (S2/S1), which is the ratio of the cross sectional area S2 of the opening in the flow contracting portion 88 to the cross sectional area S1 of the flow straightening portion 86, is too small, this will constitute a resistance when compressed air is passing through the flow contracting portion 88; if too large, then compressed air will not be able to accelerate when passing through the flow contracting portion 88. For a favorable acceleration of compressed air, it is preferable to set the cross sectional area ratio (S2/S1), being the ratio of the opening cross sectional area S2 of the flow contracting portion 88 to the cross sectional area S1 of the flow straightening portion 86, to a range of 0.3 to 0.8.

When the compressed air passes through the flow contracting portion 88, the compressed air is flow straightened so as to advance straight ahead. However, if the flow contracting portion 88 is too long, it will constitute resistance when the compressed air passes through it, causing jet velocity to drop. Hence the length L2 of the opening relative to the diameter D2 of the opening in the flow contracting portion 88 is preferably as short as possible so as to obtain a straight jet flow of compressed air. Therefore, in the embodiment of the present invention, it is preferable to set the contracting portion ratio (L2/D2), being is the ratio of the opening length L2 to the opening diameter D2 in the flow contracting portion 88, to a range of 0.1 to 0.5.

Also, the third pathway 78 of the air nozzle 62 comprises a flow straightening portion 86 as described above, further improving the straightness of the compressed air jetted from the compressed air jet portion 80, which in turn improves blast processing capacity. In addition, the occurrence of pulsing (shock waves) of the jet flow can be suppressed by the flow straightening portion 86, thereby making the suction force generated in the mixing chamber 68 constant. Hence, the quantity of suctioned ejection material suctioned from the ejection material suction port 70 on the nozzle main body 60 is constant at all times, and a stable blast processing can be performed. To obtain these effects, it is preferable to set the flow straightening portion ratio (L1/D1), being the ratio of length L1 of the flow straightening portion to diameter D1 of the flow straightening portion 86, to a range of 2 to 50.

The shape of the flow contracting portion 88 is not limited to shapes in which the inlet side and other parts have the same diameter, as shown in FIGS. 7 and 8; it may also have the shape shown in FIG. 9, wherein the inlet side is tapered and the diameter is expanded; additionally, it may have the form shown in FIG. 10, in which the inlet side has a rounded shape and the diameter is expanded.

Next, it will be explained a blast processing method using a blast processing apparatus 1 comprising a nozzle assembly 2 according to the embodiment of the present invention.

First, the control panel 30 is operated to activate the suction mechanism 6 to suction the interior of the blasting chamber 24. Next, the latch lock 22 is unlocked and the upper casing 14 opened. Next, a predetermined amount of ejection material is fed into the blast processing chamber 24, and the ejection material is transported to the storage hopper 10 through the classifying mechanism 8. The upper casing 14 is then closed and locked by the latch lock 22, affixing the upper casing 14 and lower casing 16 and turning the blast processing chamber 24 into a closed space. The blast processing chamber 24 is suctioned by the suction mechanism 6 and is therefore under negative pressure, so that outside air flows into the blast processing chamber 24 from the working portion 36. As a result of the flow of outside air, no granular material containing ejection material (ejection material and dust) leaks to the outside of the blast processing chamber 24 even when the ejection material is blasted by the nozzle assembly 2, as described below.

The ejection material should be granular material generally used in a blast processing. For example, the following may be used as ejection material: ferrous or non-ferrous metal shot or cut wire and grit, ceramic particles (e.g., alumina, silicon carbide, zirconium, etc.), glass particles, resin particles (e.g., nylon resin, melamine resin, urea resin, etc.), or vegetable seed particles (e.g., chestnuts, peaches, etc.), and the like.

An operator puts on gloves and inserts hands from the working portion 26 to grip the nozzle assembly 2. Next, a foot switch (not shown) is turned ON and a solid-gas two phase flow containing ejection material is ejected from the ejection port 74. At this time, after the operator operates the pressure adjustment valve 32 to adjust to a predetermined ejection pressure, the foot switch is turned OFF and ejecting of the ejection material is stopped, and the hand removed from the working portion 26.

Next, after the latch lock 22 is unlocked, the upper casing 14 is opened, and the workpiece W is mounted on the work plate 28, the upper casing 14 is closed and locked by the latch lock 22 to affix the upper casing 14 and the lower casing 16.

After the operator operates the control panel 30 and inserts a hand from the working portion 26 to grip the nozzle assembly 2 and the workpiece W mounted on the work plate 28, the operator turns ON the foot switch to eject a solid-gas two phase flow from the ejection port 74. The workpiece W is blast processed by the operator himself moving the workpiece W through gloves. When high processing precision is required of blast processing of the workpiece W, the operator performs processing by moving the nozzle 10 in the horizontal direction with the workpiece W held down on the work plate 28 by hand; if high processing precision is not required, the operator may also perform processing by moving the nozzle 10 closer to or further from the workpiece W.

The granular material containing ejection material ejected from the ejection port 74 is transported to the classifying mechanism 8 by the suction power of the suction mechanism 6. In the classifying mechanism 8, reusable ejection material is separated from dust, and the reusable ejection material accumulates in the storage hopper 10. The reusable ejection material piled up in the storage hopper 10 is transported to the nozzle assembly 2 by the ejection material transport mechanism 12 and again ejected from the ejection port 74. On the other hand, low-weight dust is suctioned to the suction mechanism 6 and captured on a capture filter inside the suction mechanism 6.

After ejecting solid-gas two phase flow for a predetermined time toward the workpiece W, the foot switch is turned OFF, ejecting of the solid-gas two phase flow is stopped, and the hand is removed from the working portion 26. Thereafter the latch lock 22 is unlocked, the upper casing 14 is opened, and the workpiece W is recovered. The ejection material and dust adhering to the workpiece W is removed, thereby ending a blast processing sequence.

Next, it will be explained results using examples and comparative examples to confirm the effect of the nozzle assembly 2 according to the present embodiment.

Example 1

In a nozzle assembly 2 according the embodiment of the present invention, the followings were respectively varied to measure the suction force at the ejection material suction port 70:

(1) the ratio of the cross sectional area of the opening (S2) of the flow contracting portion 88 to the cross sectional area of the flow straightening portion 86 (S1) (cross sectional area ratio S2/S1);

(2) the ratio of the opening length (L2) to the opening diameter (D2) of the flow contracting portion 88 (flow contracting portion ratio L2/D2); and (3) the ratio of the length (L1) of the flow straightening portion 86 to the diameter (D2) of the flow contracting portion 88 (flow straightening portion ratio L1/D2). The results of the measurement are explained below. In Example 1, for suction force, it were measured the "maximum static pressure" indicating the maximum value of the suction force at the nozzle assembly 2, and the "static pressure fluctuation range" indicating the stability (degree of pulsation) of the suction force.

The maximum static pressure was the average value when the ejection material suction port 70 was closed, a pressure sensor (manufactured by Keyence Corp.: AP-44) was connected thereto, and compressed air (0.2 MPa) was jetted for 10 minutes from the air nozzle 62.

A hole was formed on the side surface of the ejection material suction port 70, a pressure sensor (manufactured by Keyence Corp.: AP-44) was connected thereto, and a suction force was generated at the ejection material suction port 70 while compressed air (0.2 MPa) was jetted for 10 minutes from the air nozzle 62. The ejection material was inserted into the ejection material suction port 70 at 1 kg/min to measure static pressure when suctioned into the mixing chamber 68 by a suction force. This measurement value indicates as a percentage the maximum and minimum pressure values relative to the average pressure over 10 minutes; this was used as the static pressure fluctuation range.

Figure 11:
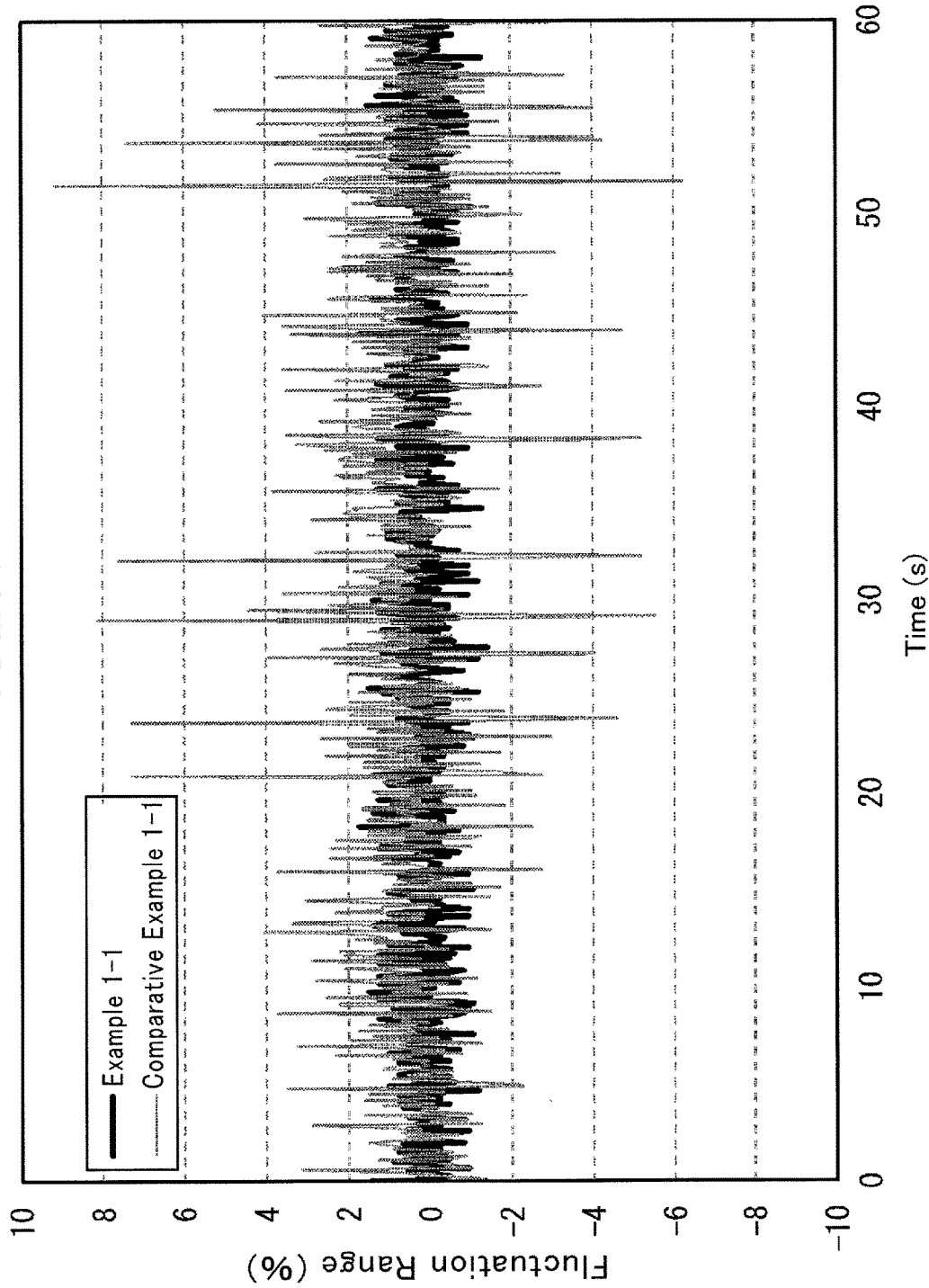
FIG. 11 is a graph showing the fluctuation range in a suction force in a nozzle assembly according to an embodiment of the present invention.

Measurement results are shown in Table 1 and FIG. 11. It was confirmed that for a maximum static pressure of −40 kPa, a favorable suction could be achieved generally without regard to an ejection material type. In conditions of the example 1-1 through 1-7, it was confirmed that the suction can be favorably achieved. It was also confirmed that so long as the fluctuation range is within ±5%, no pulsation in the jet flow and therefore no effect on the degree of finish occurs, so the favorable suction can also be achieved under the conditions of the examples 1-1 through 1-7.

On the other hand, in comparative examples 1-1 through 1-6, where the cross sectional area ratio (S2/S1), the flow contracting portion ratio (L2/D2), and the flow straightening portion ratio (L1/D2) are outside the above-described ranges, the maximum static pressure was insufficient or departed from the reference fluctuation range. However, the suction force was capable of favorably suctioning relatively light ejection material (for example, metal ejection material with a grain size of 100 μm or less, ceramic ejection material with a grain size of 200 μm or less, glass particles, resin particles, plant-based particles, etc.). The fluctuation range was one which permitted processing not requiring strict control of the degree of finish (e.g., deburring, sand removal from castings, surface roughening, etc.) without problem. This suggests, in other words, that so long as the cross sectional area ratio (S2/S1), the flow contracting portion ratio (L2/D2), and the flow straightening portion ratio (L1/D2) are within the above-described range, the ejection material can be favorably suctioned in a stable manner without selecting conditions, but blast processing can be performed, depending on conditions, even outside the above-described range.

invention). From these cutting amounts, processing efficiency was calculated using the following equation.

$$\text{Processing Efficiency Rate (\%)} = \frac{\text{Cutting amount } (g) \text{ by nozzle of example}}{\text{Cutting amount } (g) \text{ by nozzle of comparative example}} \times 100 \quad \text{Formula 1}$$

Results are shown in Table 2. It was confirmed that, as shown in the form of Examples 2-1 through 2-9, processing efficiency exceeds 100% under all conditions, improving processing capacity compared to a conventional nozzle assembly. In the nozzle assembly 2 of the embodiment of the present invention, the improvement in processing efficiency was more markedly manifest as jet pressure decreased.

TABLE 2

| | Condition | | Result |
|---|---|---|---|
| | Nozzle Type | Blast Pressure (MPa) | Work Efficiency (%) |
| Example 2-1 | A | 0.2 | 136 |
| Example 2-2 | A | 0.3 | 126 |
| Example 2-3 | A | 0.4 | 124 |

TABLE 1

| | Conditions | | | Results | |
|---|---|---|---|---|---|
| | Cross Sectional Area Ratio (S2/S1) | Flow Contracting Portion Ratio (L2/D2) | Flow Straightening Portion Ratio (L1/D2) | Max. Static Pressure (kPa) | Fluctuation Range (%) |
| Example 1-1 | 0.5 | 0.5 | 20 | −50 | −1.2~+2.1 |
| Example 1-2 | 0.1 | 0.5 | 20 | −49 | −1.2~+2.2 |
| Example 1-3 | 1.5 | 0.5 | 20 | −42 | −3.7~+4.0 |
| Example 1-4 | 0.5 | 0.3 | 20 | −41 | −4.0~+4.5 |
| Example 1-5 | 0.5 | 0.8 | 20 | −40 | −4.3~+4.7 |
| Example 1-6 | 0.5 | 0.5 | 2 | −42 | −3.5~+4.2 |
| Example 1-7 | 0.5 | 0.5 | 50 | −47 | −2.3~+3.5 |
| Comp. Ex 1-1 | 0.05 | 0.5 | 20 | −24 | −6.2~+9.5 |
| Comp. Ex 1-2 | 3.0 | 0.5 | 20 | −32 | −4.7~+7.0 |
| Comp. Ex 1-3 | 0.5 | 0.1 | 20 | −27 | −5.7~+8.9 |
| Comp. Ex 1-4 | 0.5 | 1.5 | 20 | −30 | −4.9~+7.8 |
| Comp. Ex 1-5 | 0.5 | 0.5 | 1 | −28 | −5.8~+8.7 |
| Comp. Ex 1-6 | 0.5 | 0.5 | 100 | −37 | −4.2~+6.2 |

Example 2

It will be explained results of blast processing carried out using the nozzles of the examples 1-1, 1-4, and 1-5 in Example 1 (indicated below as "nozzle A," "nozzle B," and "nozzle C"). A blast processing was done using an alumina abrasive grain as ejection material (manufactured by Shin-tokogio Ltd.: AF120 (average grain size 125 μm)), with an ejection directed at the workpiece (60×60×t6 mm SS400 material) for one minute. Note that the distance between the ejection port 74 and the workpiece W was set at 100 mm, and the ejection pressure at 0.2 to 0.4 MPa. The weights of the processed workpiece W and the workpiece W before processed were measured on an electronic scale (manufactured by A&D: GH-200) to calculate the cutting amount. The same type of processing and measurement was performed and the cutting amount calculated using a conventional suction-type nozzle assembly (without the flow contracting portion 88 of the embodiment of the present TABLE 2-continued

| | Condition | | Result |
|---|---|---|---|
| | Nozzle Type | Blast Pressure (MPa) | Work Efficiency (%) |
| Example 2-4 | B | 0.2 | 116 |
| Example 2-5 | B | 0.3 | 112 |
| Example 2-6 | B | 0.4 | 112 |
| Example 2-7 | C | 0.2 | 115 |
| Example 2-8 | C | 0.3 | 108 |
| Example 2-9 | C | 0.4 | 106 |

In the above-described embodiment, the example in which the nozzle assembly of the present invention was applied to the blast processing, but the nozzle assembly of the present invention may also be applied to other surface processing and processing methods. For example, by ejecting steel or non-ferrous metal shot as ejection material at high velocity toward a workpiece, the process can be applied to "shot peening" to impart work hardening or compressive residual stress based on plastic deformation of the workpiece. As another example, by ejecting coating-forming granular material (e.g. metals such as tin, zinc, aluminum, etc., metal compounds such as molybdenum disulfide, metal oxides, etc.) toward a workpiece at a high velocity, a "coat forming" processing can be applied to form a coating on the workpiece using the plastic deformation of the granular material.

What is claimed is:

1. A nozzle assembly for processing a surface of a workpiece by ejecting a solid-gas two phase flow in which ejection materials are mixed with compressed air flow, the nozzle assembly comprising:

a nozzle main body including an ejection material suction port configured to suction the ejection materials into the nozzle main body, and an ejection port configured to eject the suctioned ejection materials with the compressed air flow from the nozzle main body; and an air nozzle configured to jet the compressed air flow into the nozzle main body;

wherein the nozzle main body includes a mixing chamber forming a space for mixing the ejection materials suctioned into the nozzle main body from the ejection material suction port with the compressed air flow jetted from the air nozzle, a first pathway configured to direct a flow of the ejection materials from the ejection material suction port toward the mixing chamber, and a second pathway configured to direct the compressed air flow containing the ejection materials from the mixing chamber toward the ejection port;

wherein the air nozzle includes a compressed air jet portion formed at a tip thereof and a third pathway configured to direct the compressed air flow toward the compressed air jet portion, and the air nozzle is inserted into the nozzle main body so that the third pathway is as aligned with the second pathway of the nozzle main body, and the compressed air jet portion is positioned in the mixing chamber of the nozzle main body;

wherein the compressed air jet portion of the air nozzle is provided with a cylindrical flow contracting portion having an opening whose cross section is smaller than a cross section of the third pathway;

wherein the third pathway of the air nozzle includes a flow straightening portion having a uniform cross sectional area along its length, and wherein the flow contracting portion communicates with the flow straightening portion, and a cross sectional area ratio (S2/S1) of an opening area (S2) of the opening of the flow contracting portion with respect to a cross sectional area (S1) of the flow straightening portion is set at 0.3 to 0.8; and wherein a flow contracting portion ratio (L2/D2) of an axial length (L2) of the opening of the flow contracting portion with respect to a diameter (D2) of the opening of the flow contracting portion of the air nozzle is set at 0.1 to 0.5.

2. The nozzle assembly according to claim 1, wherein a flow straightening portion ratio (L1/D1) of an axial length (L1) of the flow straightening portion with respect to a diameter (D1) of the flow straightening portion is set at 2 to 50.

3. The nozzle assembly according to claim 1, wherein the nozzle assembly ejects abrasive grains which are used as the ejection materials in a blast processing apparatus.

4. A surface processing method for processing the surface of a workpiece by using the nozzle assembly according to claim 1, comprising the steps of:

jetting the compressed air flow into the mixing chamber in the nozzle main body from the air nozzle, and negatively pressurizing the mixing chamber;

suctioning the ejection materials into the mixing chamber from the ejection material suction port of the nozzle main body by using a negative pressure in the mixing chamber of the nozzle main body, and mixing the ejection materials with the compressed air flow jetted from the air nozzle in the mixing chamber;

ejecting the solid-gas two phase flow from an ejection port of the nozzle main body; and processing the surface of the workpiece by a collision of the ejected ejection materials with the surface of the workpiece;

wherein jetting the compressed air flow from the air nozzle suppresses an expansion of the jetted compressed air flow by the flow contracting portion of the air nozzle.

5. The surface processing method according to claim 4, wherein the compressed air flow jetted from the air nozzle has a higher velocity in an outer peripheral of the jetted compressed air flow than an interior thereof.

* * * * *